Sept. 14, 1965            C. B. ESTES            3,205,774
THERMALLY COMPENSATED PLASTIC TRIPLET LENS
Filed July 24, 1961
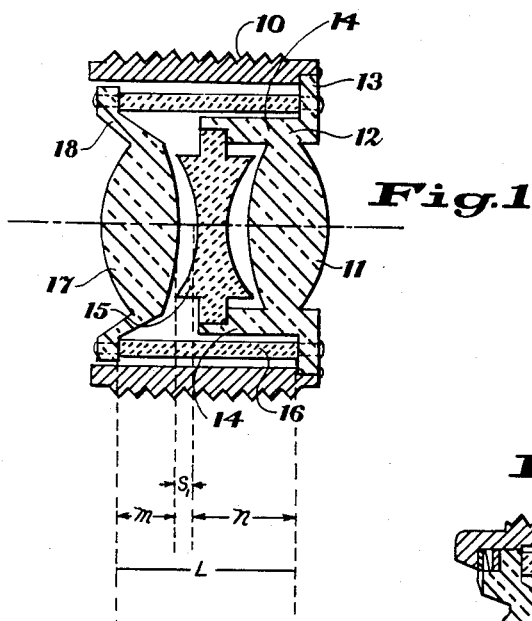
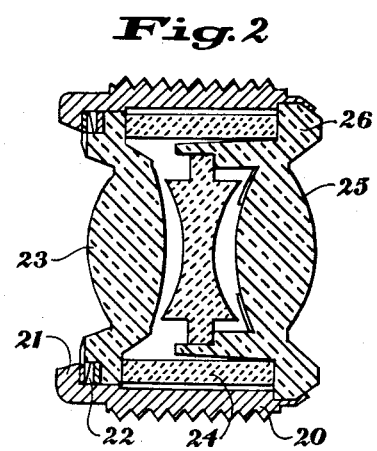
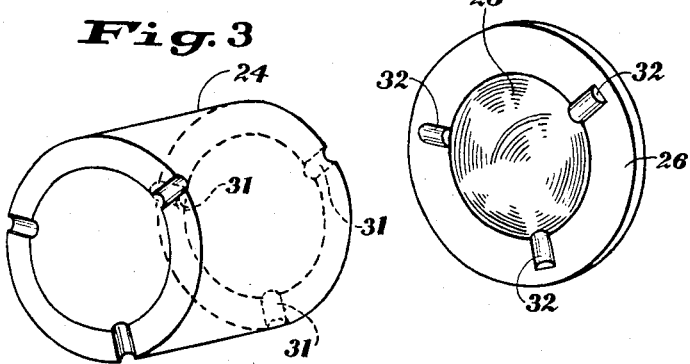
Cameron B. Estes
INVENTOR.
BY R. Frank Smith
F. M. Emerson Holmes
ATTORNEYS

United States Patent Office 3,205,774
Patented Sept. 14, 1965

3,205,774
THERMALLY COMPENSATED PLASTIC TRIPLET LENS
Cameron B. Estes, Rochester, N.Y., assignor to Eastman Kodak Company, Rochester, N.Y., a corporation of New Jersey
Filed July 24, 1961, Ser. No. 126,168
4 Claims. (Cl. 88—57)

This invention relates to photographic objectives, and more particularly to photographic objectives compensated to have a substantially constant back focal length despite large changes in the temperature of the objective.

The back focal length of an objective, which is the distance from the rear lens surface to the image plane, is dependent on the indices of refraction of the lens elements making up the objective, and also on the dimensions of the elements and airspaces within the objective. As the temperature of the objective changes, the indices of refraction of the lens elements and also their linear dimensions change, and consequently the back focal length of the lens changes. This thermal change of back focal length causes the image plane of an object at a fixed distance from the objective to shift, making it necessary to refocus the objective or move the film plane in a camera to keep the image quality at its best.

In ordinary optical glasses, the thermal coefficient of index of refraction is of the order of $-2 \times 10^{-6}/°$ C., and the thermal coefficient of linear expansion is of the order of $8 \times 10^{-6}/°$ C. Over ordinary temperature ranges at which cameras are used the back focal changes corresponding to coefficients of this magnitude are usually negligible, becoming important only when large temperature ranges and extreme precision are involved, for example, in aerial cameras.

On the other hand, typical plastics used in lens manufacture have thermal coefficients of index 50 to 60 times greater and thermal coefficients of linear exxpansion 10 times greater than those of optical glass. In the case of polymethylmethacrylate, for example, the index coefficient is $-1.2 \times 10^{-4}/°$ C. and the linear coefficient is $7.5 \times 10^{-5}/°$ C. Such relatively large coefficients produce effects which are not negligible even over ordinary temperature ranges, and the image plane produced by a plastic objective will move considerably in the temperature range over which a camera might ordinarily be used.

It is possible to compensate for the movement of the image plane relative to the objective by using thermal movements of the objective mounting support to move the entire objective so as to keep the image plane fixed, or by using thermal movements of the film plane support to keep the film plane and image plane in coincidence. These methods are used in aerial cameras, but are too complicated and expensive for low-cost, simple cameras using plastic lenses.

In some objectives, particularly triplets, the back focal length of the objective may be varied slightly without adversely affecting the corrections for aberrations by varying one of the airspaces. Another method of keeping the back focal length of an objective constant with temperature changes, using this fact, is to control one of the airspaces in the objective by thermally sensitive means.

This method, which uses a spacer member of the proper length and thermal coefficient of linear expansion to vary one airspace of an objective relative to the other airspaces and linear dimensions of the objective is simple and economical and can provide good temperature compensation of back focal length over a wider temperature range than is usually encountered in the ordinary use of a camera. My invention uses this method of temperature compensation.

The use of a thermally controlled varying airspace to compensate back focal length is known in the art, but has always involved the use of two or more dissimilar metals to control the airspace, for example, brass and invar. Metals, in general, while suitable for use with optical glasses, are not practical for use with plastic lenses, because the large thermal change of index requires a relatively large thermal change of airspace and the metallic spacers must be quite long. Also, metallic parts are relatively expensive to manufacture. My invention uses plastic materials for controlling the airspace in an objective. These have the advantages (1) that their thermal coefficients of linear expansion are large compared to those of metals, and (2) that they may be economically fabricated in a wide variety of forms. I have found that precise compensation can be obtained with such plastics, well within the space available in a compact lens mount. Furthermore, mounting arrangements may be molded integrally with the lens elements, further contributing to compactness, economy of manufacture, and ease of accurate assembly.

One object of my invention, then, is to make an objective which is compensated to keep the image plane fixed despite temperature changes. Another object of my invention is to make a thermally compensated objective which can be constructed of inexpensive plastic lens elements. Still another object of my invention is to make a compact thermally compensated objective mount which may be easily and accurately fabricated of molded plastic parts. The way in which these objects are achieved may be seen by reference to the drawings and the description below.

Referring now to the drawing:

FIG. 1 shows a simple embodiment of my invention in a triplet lens;

FIG. 2 shows another embodiment which may be assembled accurately and more easily than that of FIG. 1; and FIG. 3 is a detail drawing of parts of FIG. 2 showing one means of centering lenses and parts accurately on an optical axis.

In FIG. 1 the objective assembly is carried in a mount tube 10. A positive lens element 11, having integrally molded supporting means 12 comprising a first supporting member 13 and a second supporting member 14, is held firmly with relation to the tube 10 by fastening the first supporting member 13 to the tube in any suitable manner, as by spinning the end of the tube over, or by staking or cementing. The lens element 11 is made of any suitable plastic material similar to crown glass, for example, polymethylmethacrylate. A negative lens 15, made of a plastic material similar in optical properties to flint glass, for example, an acrylonitrile-styrene copolymer, is carried in fixed relationship to the lens 11 by the second supporting member 14.

A compensating spacer tube 16 of length L is attached to the first supporting member by any suitable means, for example, by small screws or by cementing. A positive lens element 17, made of a plastic equivalent of crown glass and preferably of the same material as the lens 11, and having integrally molded mounting means 18, is carried on the spacer tube by fastening its mounting means to the tube in any suitable manner, such as by small screws or cementing. The spacer tube 16 and lens element 17 are free to move axially in the mount tube 10.

It is noted that the effective length of the spacer tube or member 16 is greater than the axial distance between the centers of the positive elements, but still not so great as to detract from the compactness of the system. The spacer is less than twice the distance between the elements centers. This compactness is one of the advantages of the present invention. That is, by the use of specified materials, I have discovered that full compensation can be obtained without unwieldy spacers.

To understand the operation of the mount, first consider the objective at a fixed temperature $T_0$. The back focus at this temperature may be varied by varying the airspace $s_1$; increasing $s_1$ decreases the back focal length and decreasing $s_1$ increases the back focal length. Now if the temperature of the objective is raised above $T_0$, the back focal length tends to increase both because of the linear expansion of the elements and, more importantly, because of the change of index of refraction of the lens elements. If the airspace $s_1$ increases at a greater rate than the other linear dimensions because of a higher coefficient of linear expansion of spacer tube 16, this natural increase of back focal length will be counteracted, and if the length of the spacer tube and its thermal coefficient of expansion are properly chosen, the back focal length may be made the same at some selected higher temperature $T_2$ as it was at $T_0$. The same action as described occurs in reverse as the temperature is decreased below $T_0$ to a temperature $T_1$. In the entire range from $T_1$ to $T_2$, the back focal length may be made substantially constant by a proper choice of coefficient of expansion and length for the spacer tube 16.

The required change in $s_1$ in any given objective over the selected temperature range $T_1$ to $T_2$ may be calculated by straightforward means well known to lens designers, but such calculations are laborious and will not be set forth here.

Once the required change in $s_1$, here called $\Delta s_1$, has been determined by the lens designer, the relationship between the length L and thermal coefficient of linear expansion $\alpha$ of the compensating spacer tube may be determined from the following formulae:

$$\alpha = \frac{\Delta s_1}{L(T_2-T_1)} + \left(\frac{m+n}{L}\right)\beta$$

$$L = \frac{\Delta s_1}{\alpha(T_2-T_1)} + (m+n)\frac{\beta}{\alpha}$$

where $\beta$ = coefficient of expansion of the material of all lenses and supporting member 14, assumed to be the same, which is a good approximation in the usual case;

$m$ = distance from the plane of the left end of spacer tube 16 to inner vertex of surface of lens 17; and $n$ = distance from the plane of the right end of spacer tube 16 to left vertex of surface of lens 15.

From these formulae, the required spacer length may be calculated if the coefficient of expansion $\alpha$ is known, or conversely, if the spacer length is determined, the required coefficient of expansion for best compensation may be found.

I have found that in ordinary Cooke triplet lenses suitable values of $\alpha$ for a practical lengths L are in the range $15 \times 10^{-5}/°$ C. to $30 \times 10^{-5}/°$ C. Practical lengths are those which are short enough to fit in a compact mount.

Suitable materials for the spacer, having such values of $\alpha$, include polyethylene, polyvinylidene chloride, cellulose propionate, and ethyl celluose, and these particular materials are preferred because of the ease of molding and their rigidity when in the mount.

Coefficients of expansion for these and other materials are reasonably accurately reported in the literature, but they are usually given as ranges and highest precision would, at first sight, seem to require measurement of coefficients of each batch of material used. That is, the coefficient of expansion appears to be affected by so many variables in the formulation of the material and the molding process employed that published coefficients can only be approximations. However, the variations are not as troublesome as might be anticipated. In actual practice, satisfactory compensation is obtained even when the true coefficient is not exactly the same as the one used in design calculations. In one example, the published coefficients were used to calculate a length L, and then a sample spacer was made and tried in an objective. Measurements were made of the variation of back focus with temperature in the sample, and these indicated both reasonable acceptability and also whether L should be made greater or less, or alternatively, whether $\alpha$ should be increased or decreased to improve the results. In this particular example, I found that a spacer 0.3 inch in length (and 0.4 inch mean diameter) of polyethylene had a coefficient of expansion apparently equal to $18 \times 10^{-5}/°$ C. which was within the published range, and happened to be the value I had used for computation. While my first computation gave highest precision, if the figure had come out slightly different I would have repeated the computation a second time using this newly found exact value of $\alpha$. Thus, I would have been led to the maximum precision.

In FIG. 2 is shown another embodiment of my invention, using a simple means of centering the spacer tube and moving lens in the optic axis of the objective. FIG. 3 shows the centering means at one end of the spacer tube. The spacer tube 24 is provided with 3 radial indentations 31 of semi-circular cross-section spaced 120° around its axis, and the first supporting member 26 has 3 mating lugs 32 raised on its surface. When the lugs and indentations are engaged the axis of the tube coincides with the axis of lens 25. Similar lugs and indentations center the movable positive lens 23 at the other end of the tube. The assembly is held together in contact by a circular spring 22 resting against the lip 21 turned over on the mount 20 at one end, and the mount is spun over the supporting member 26 at the other end.

The arrangement shown here may also be used with glass-and-plastic objectives by selecting material for the spacer tube, in the manner outlined above.

The invention has been described in detail with particular reference to preferred embodiments thereof, but it will be understood that variations and modifications can be effected within the spirit and scope of the invention as described hereinabove and as defined in the appended claims.

I claim:

1. A thermally compensated objective comprising two positive lens elements of polymethylmethacrylate axially aligned and spaced on opposite sides of a negative lens element of acrylonitrile-styrene copolymer, the focal length measured from the outer rear surface of the rear positive element being substantially independent of changes in temperature, means for supporting the negative element spaced from the rear positive element by a member made of polymethylmethacrylate and means for supporting the front positive element spaced from the rear positive element by a spacer of a material having a thermal coefficient of linear expansion in the range $15 \times 10^{-5}/°$ C. to $30 \times 10^{-5}/°$ C., the axial length of said spacer being greater than once, and less than twice, the axial distance between the centers of the two positive elements.

2. An objective according to claim 1 in which said spacer is made of a plastic material selected from the group consisting of polyethylene, polyvinylidene chloride, cellulose propionate, and ethyl celluose.

3. An objective according to claim 1 in which the means for supporting the negative element has as the spacing member an axially extending peripheral portion of the rear positive lens element.

4. An objective according to claim 1 in which each lens element has a peripheral extension molded integrally therewith, the extension on the rear positive element extending forward to contact and support the extension on the negative element and said spacer engaging and spacing the extensions on the two positive elements.

References Cited by the Examiner

UNITED STATES PATENTS

| | | | |
|---|---|---|---|
| 1,325,936 | 12/19 | Fouasse | 88—57 |
| 2,423,492 | 8/47 | Fairbank | 88—57 |
| 2,443,390 | 6/48 | Kingston | 88—57 |

FOREIGN PATENTS

| | | |
|---|---|---|
| 561,503 | 5/44 | Great Britain. |

JEWELL H. PEDERSEN, *Primary Examiner.*

EMIL G. ANDERSON, FREDERICK M. STRADER, *Examiners.*